(12) United States Patent
Terashima et al.

(10) Patent No.: US 7,671,793 B2
(45) Date of Patent: Mar. 2, 2010

(54) POSITIONING SYSTEM, TERMINAL APPARATUS, METHOD OF CONTROLLING TERMINAL APPARATUS, PROGRAM FOR CONTROLLING TERMINAL APPARATUS AND COMPUTER-READABLE STORING MEDIUM FOR STORING PROGRAM FOR CONTROLLING TERMINAL APPARATUS

(75) Inventors: Maho Terashima, Matsumoto (JP); Tomoyuki Kurata, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 388 days.

(21) Appl. No.: 11/337,688

(22) Filed: Jan. 24, 2006

(65) Prior Publication Data

US 2006/0187115 A1    Aug. 24, 2006

(30) Foreign Application Priority Data

Jan. 25, 2005    (JP) .............................. 2005-016812

(51) Int. Cl.
*G01S 1/00*    (2006.01)
(52) U.S. Cl. ................................. 342/357.09
(58) Field of Classification Search ...............................
342/357.08–357.09
See application file for complete search history.

(56) References Cited

U.S. PATENT DOCUMENTS

| | | | |
|---|---|---|---|
| 5,878,369 A * | 3/1999 | Rudow et al. ............... 701/215 |
| 6,166,687 A * | 12/2000 | Ishikawa et al. ....... 342/357.16 |
| 6,289,279 B1 | 9/2001 | Ito et al. |
| 6,289,280 B1 * | 9/2001 | Fernandez-Corbaton et al. .......................... 701/214 |
| 6,369,755 B1 | 4/2002 | Nichols et al. |
| 2001/0028321 A1 | 10/2001 | Krasner |
| 2002/0080064 A1 | 6/2002 | Kim |
| 2002/0097182 A1 | 7/2002 | Goren et al. |
| 2006/0267841 A1 * | 11/2006 | Lee et al. ..................... 342/463 |
| 2007/0063897 A1 | 3/2007 | Matsuda |
| 2007/0265020 A1 * | 11/2007 | Cuffaro ................... 455/456.5 |

FOREIGN PATENT DOCUMENTS

| | | | |
|---|---|---|---|
| JP | 2002044711 A | 8/2002 |
| KR | 2001-0034078 A | 4/2001 |
| KR | 2001-0071166 A | 7/2001 |
| WO | WO-2005/012939 A1 | 2/2005 |

* cited by examiner

*Primary Examiner*—Thomas H Tarcza
*Assistant Examiner*—Nga X Nguyen
(74) *Attorney, Agent, or Firm*—Global IP Counselors, LLP (57) ABSTRACT

A communication base station has: a communication signal sending device for sending a communication signal including base station position information indicating a position of the communication base station and sending direction information indicating a sending direction from the communication base station, and the terminal apparatus has: a communication signal receiving device; a base station pseudo range information generating device; a satellite orbital position information generating device; a satellite pseudo range information generating device; a candidate position information generating device; and a positioning location information generating device for designating one position out of positions on the circumference indicated in the candidate position information on the basis of the sending direction information to generate positioning location information, and so on.

3 Claims, 7 Drawing Sheets

POSITIONING SYSTEM, TERMINAL APPARATUS, METHOD OF CONTROLLING TERMINAL APPARATUS, PROGRAM FOR CONTROLLING TERMINAL APPARATUS AND COMPUTER-READABLE STORING MEDIUM FOR STORING PROGRAM FOR CONTROLLING TERMINAL APPARATUS

This application claims priority under 35 U.S.C. §119 of Japanese Patent Application No. 2005-016812 filed on Jan. 25, 2005, which is hereby incorporated in its entirety by reference.

BACKGROUND OF THE INVENTION

1. Technical Field

The present invention relates to a positioning system, a terminal apparatus, a method of controlling the terminal apparatus, a program for controlling the terminal apparatus and a computer-readable storing medium for storing the program for controlling the terminal apparatus, the positioning system and the terminal apparatus using a signal from a communication base station and a signal from a positioning satellite.

2. Related Art

Up to now, a positioning system using a GPS (global positioning system), which is a satellite navigation system, for example, for positioning a current position of a GPS receiver and a positioning system using a radio wave from a communication base station of a cellular phone have been put to practical use.

In a GPS receiver or a cellular phone, radio waves are received from three or more GPS satellites and/or communication base stations in total to calculate a distance between the respective GPS satellites or such and the GPS receiver or such (referred to as a pseudo range, hereinafter) on the basis of a difference between a time the radio wave is sent from each of the GPS satellites or such and a time the radio wave arrives at the GPS receiver or such (referred to as a delay time, hereinafter), for example. Positions of the respective GPS satellites or such and the above-mentioned pseudo range are used for performing a positioning operation of the current position. The positioning operation enables a positioning location composed of a longitude, a latitude and an altitude, for example, to be obtained.

The signals, however, are not always received from three or more GPS satellites and/or communication base stations.

On the other hand, proposed has been a technique for selecting a point nearest to a reckoned position of a mobile station out of points on a circumference, the points being intersections of two spherical surfaces whose radiuses are the pseudo ranges from the two communication base stations, which are the center of the spherical surfaces (in JP-A-2002-44711, for example).

JP-A-2002-44711 (FIG. 3 and the like) is an example of related art.

The above technique, however, has a problem that positioning is impossible when signals cannot be received from two communication base stations.

SUMMARY

An advantage of the invention is to provide a positioning system, a terminal apparatus, a method of controlling the terminal apparatus, a program for controlling the terminal apparatus and a computer-readable storing medium for storing the program for controlling the terminal apparatus, wherein a current position can be positioned so long as the terminal apparatus is capable of communicating with one communication base station and receiving a satellite signal from one positioning satellite.

A positioning system according to a first aspect of the invention is a positioning system comprising: a terminal apparatus capable of receiving a satellite signal, which is a signal from a positioning satellite; and a communication base station capable of communicating with the terminal apparatus, the communication base station including communication signal sending means for sending a communication signal including base station position information indicating a position of the communication base station and sending direction information indicating a sending direction from the communication base station, and the terminal apparatus including: communication signal receiving means for receiving the communication signal from the communication base station; base station information obtaining means for obtaining the base station position information and the sending direction information from the communication signal; base station pseudo range information generating means for generating base station pseudo range information indicating a distance between the communication base station and the terminal apparatus on the basis of an arrival delay time that the communication signal takes to arrive at the terminal apparatus from the communication base station; satellite orbital position information generating means for generating satellite orbital position information indication a position in an orbit of the positioning satellite on the basis of the satellite signal from the positioning satellite; satellite pseudo range information generating means for generating satellite pseudo range information indicating a distance between the positioning satellite and the terminal apparatus on the basis of an arrival delay time that the satellite signal takes to arrive at the terminal apparatus from the positioning satellite; candidate position information generating means for generating candidate position information shown by a circumference of a set of intersections between a spherical surface whose radius is a distance indicated in the base station pseudo range information from the position of the communication base station indicated in the base station position information and a spherical surface whose radius is a distance indicated in the satellite pseudo range information from the position of the positioning satellite indicated in the satellite orbital position information; and positioning location information generating means for designating one position out of positions on the circumference indicated in the candidate position information on the basis of the sending direction information to generate positioning location information.

In accordance with the first aspect of the invention, the communication base station includes the base station information sending means, so that the base station position information and the sending direction information can be sent.

On the other hand, the terminal apparatus includes the base station information obtaining means. Accordingly, the base station position information and the sending direction information can be obtained from the communication base station.

The terminal apparatus can generate the base station pseudo range information since it includes the base station pseudo range information generating means.

Further, the terminal apparatus includes the satellite orbital position information generating means and this allows the satellite orbital position information to be generated. The terminal apparatus also includes the satellite pseudo range information generating means and this allows the satellite pseudo range information to be generated.

Moreover, the terminal apparatus can generate the candidate position information since it includes candidate position information generating means. The terminal apparatus can also designate one position out of positions on a circumference indicated in the candidate position information on the basis of the sending direction information to generate the positioning location information since it includes the positioning location information generating means.

Thus, in accordance with the positioning system, the current position can be positioned so long as the terminal apparatus is capable of communicating with one communication base station and receiving the satellite signal from one positioning satellite.

Generally, the precision of positioning with the satellite signal from the positioning satellite is higher than that of positioning with the communication signal from the communication base station. This means that using the satellite signal allows highly precise positioning to be carried out.

In view of the above, in accordance with the positioning system, the terminal apparatus uses the communication signal from one communication base station and the satellite signal from one positioning satellite to perform positioning as described above, so that positioning with higher precision than the case of positioning only with plural communication signals can be achieved.

In addition, when a reckoned position of the current position is used as in the usual case, a wrong reckoned position leads an error in a positioning result. The terminal apparatus, however, generates the positioning location information on the basis of a certain ground as described above without using information obtained by reckoning. This enables the positioning location information to be generated with high reliability.

A terminal apparatus according to a second aspect of the invention is a terminal apparatus capable of receiving a satellite signal, which is a signal from a positioning satellite, the terminal apparatus comprising: communication signal receiving means for receiving a communication signal from a communication base station; base station information obtaining means for obtaining from the communication signal base station position information indicating a position of the communication base station and sending direction information indicating a sending direction of the communication signal; base station pseudo range information generating means for generating base station pseudo range information indicating a distance between the communication base station and the terminal apparatus on the basis of an arrival delay time that the communication signal takes to arrive at the terminal apparatus from the communication base station; satellite orbital position information generating means for generating satellite orbital position information indicating a position in an orbit of the positioning satellite on the basis of the satellite signal from the positioning satellite; satellite pseudo range information generating means for generating satellite pseudo range information indicating a distance between the positioning satellite and the terminal apparatus on the basis of an arrival delay time that the satellite signal takes to arrive at the terminal apparatus from the positioning satellite; candidate position information generating means for generating candidate position information shown by a circumference of a set of intersections between a spherical surface whose radius is a distance indicated in the base station pseudo range information from the position of the communication base station indicated in the base station position information and a spherical surface whose radius is a distance indicated in the satellite pseudo range information from the position of the positioning satellite indicated in the satellite orbital position information; and positioning location information generating means for designating one position out of positions on the circumference indicated in the candidate position information on the basis of the sending direction information to generate positioning location information.

In accordance with the second aspect of the invention, the current position can be positioned so long as the terminal apparatus is capable of communicating with one communication base station and receiving the satellite signal from one positioning satellite, similarly to the first aspect of the invention.

Further, the terminal apparatus uses the communication signal from one communication base station and the satellite signal from one positioning satellite to perform positioning, so that positioning with higher precision than the case of positioning only with plural communication signals can be achieved.

A terminal apparatus according to a third aspect of the invention is the terminal apparatus according to the second aspect of the invention, wherein the positioning location information generating means is arranged to designate one position nearest to a line, which is an extended line in the sending direction indicated in the sending direction information, out of positions on the circumference indicated in the candidate position information to generate the positioning location information.

A terminal apparatus according to a fourth aspect of the invention is the terminal apparatus according to the second aspect of the invention, comprising: altitude information storing means for storing altitude information indicating an altitude of the position of the terminal apparatus, wherein the positioning location information generating means is arranged to designate one position out of positions on the circumference indicated in the candidate position information on the basis of the sending direction information and the altitude information.

In accordance with the fourth aspect of the invention, the positioning location information generating means is arranged to designate one position out of positions on the circumference indicated in the candidate position information on the basis of the sending direction information and the altitude information. That is to say, not only the sending direction information but also the altitude information are used for designating one position. This allows the reliability of the positioning location information to be higher than the case of designating one position on the basis of only the sending direction information.

A terminal apparatus according to a fifth aspect of the invention is the terminal apparatus according to the fourth aspect of the invention, wherein the positioning location information generating means is arranged to calculate two intersections between the circumference indicated in the candidate position information and a plane defined by the altitude indicated in the altitude information to designate one of the two intersections on the basis of the sending direction information for the purpose of generating the positioning location information.

In accordance with the fifth aspect of the invention, the positioning location information generating means is arranged to calculate two intersections between the circumference indicated in the candidate position information and a plane defined by an altitude indicated in the altitude information to designate one intersection on the basis of the sending direction information for the purpose of generating the positioning location information.

That is to say, the sending direction information is used for designating one of two intersections, so that only the precision capable of designating one of the two intersections is required.

Accordingly, one of the two intersections can be designated and the positioning location information can be generated even when the precision of the sending direction information is low so long as one of the two intersections can be designated with the precision.

A method of controlling a terminal apparatus according to a sixth aspect of the invention is a method of controlling a terminal apparatus comprising the steps of: receiving from a communication base station a communication signal including base station position information indicating a position of the communication base station and sending direction information indicating a sending direction by means of a terminal apparatus capable of receiving a satellite signal, which is a signal from a positioning satellite; obtaining from the communication signal the base station position information and the sending direction information by means of the terminal apparatus; generating base station pseudo range information indicating a distance between the communication base station and the terminal apparatus by means of the terminal apparatus on the basis of an arrival delay time that the communication signal takes to arrive at the terminal apparatus from the communication base station; generating satellite orbital position information indicating a position in an orbit of the positioning satellite on the basis of the satellite signal from the positioning satellite by means of the terminal apparatus; generating satellite pseudo range information indicating a distance between the positioning satellite and the terminal apparatus by means of the terminal apparatus on the basis of an arrival delay time that the satellite signal takes to arrive at the terminal apparatus from the positioning satellite; generating candidate position information shown by a circumference of a set of intersections between a spherical surface whose radius is a distance indicated in the base station pseudo range information from the position of the communication base station indicated in the base station position information and a spherical surface whose radius is a distance indicated in the satellite pseudo range information from the position of the positioning satellite indicated in the satellite orbital position information by means of the terminal apparatus; and designating one position out of positions on the circumference indicated in the candidate position information on the basis of the sending direction information to generate positioning location information by means of the terminal apparatus.

In accordance with the sixth aspect of the invention, the current position can be positioned so long as the terminal apparatus is capable of communicating with one communication base station and receiving the satellite signal from one positioning satellite, similarly to the second aspect of the invention.

Further, the terminal apparatus uses the communication signal from one communication base station and the satellite signal from one positioning satellite to perform positioning, so that positioning with higher precision than the case of positioning only with plural communication signals can be achieved.

A program of controlling a terminal apparatus according to a seventh aspect of the invention is a program of controlling a terminal apparatus for letting a computer execute the steps of: receiving from a communication base station a communication signal including base station position information indicating a position of the communication base station and sending direction information indicating a sending direction of the communication signal by means of the terminal apparatus capable of receiving a satellite signal, which is a signal from a positioning satellite; obtaining from the communication signal the base station position information and the sending direction information by means of the terminal apparatus; generating base station pseudo range information indicating a distance between the communication base station and the terminal apparatus by means of the terminal apparatus on the basis of an arrival delay time that the communication signal takes to arrive at the terminal apparatus from the communication base station; generating satellite orbital position information indicating a position in an orbit of the positioning satellite on the basis of the satellite signal from the positioning satellite by means of the terminal apparatus; generating satellite pseudo range information indicating a distance between the positioning satellite and the terminal apparatus by means of the terminal apparatus on the basis of an arrival delay time that the satellite signal takes to arrive at the terminal apparatus from the positioning satellite; generating candidate position information shown by a circumference of a set of intersections between a spherical surface whose radius is a distance indicated in the base station pseudo range information from the position of the communication base station indicated in the base station position information and a spherical surface whose radius is a distance indicated in the satellite pseudo range information from the position of the positioning satellite indicated in the satellite orbital position information by means of the terminal apparatus; and designating one position out of positions on the circumference indicated in the candidate position information on the basis of the sending direction information to generate positioning location information by means of the terminal apparatus.

A computer-readable storing medium for storing a program of controlling a terminal apparatus according to an eighth aspect of the invention is a computer-readable storing medium for storing a program of controlling a terminal apparatus for letting a computer execute the steps of: receiving from a communication base station a communication signal including base station position information indicating a position of the communication base station and sending direction information indicating a sending direction by means of the terminal apparatus capable of receiving a satellite signal, which is a signal from a positioning satellite; obtaining from the communication signal the base station position information and the sending direction information by means of the terminal apparatus; generating base station pseudo range information indicating a distance between the communication base station and the terminal apparatus by means of the terminal apparatus on the basis of an arrival delay time that the communication signal takes to arrive at the terminal apparatus from the communication base station; generating satellite orbital position information indicating a position in an orbit of the positioning satellite on the basis of the satellite signal from the positioning satellite by means of the terminal apparatus; generating satellite pseudo range information indicating a distance between the positioning satellite and the terminal apparatus by means of the terminal apparatus on the basis of an arrival delay time that the satellite signal takes to arrive at the terminal apparatus from the positioning satellite; generating candidate position information shown by a circle of a set of intersections between a spherical surface whose radius is a distance indicated in the base station pseudo range information from the position of the communication base station indicated in the base station position information and a spherical surface whose radius is a distance indicated in the satellite pseudo range information from the position of the positioning satellite indicated in the satellite orbital position information by means of the terminal apparatus; and designating one position out of positions on the circumference indicated in the candidate position information on the basis of the sending direction information to generate positioning location information by means of the terminal apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described in detail hereinafter, mading reference to the attached drawings.

Embodiments to be described below are preferable concrete examples of the invention, and therefore, have various kinds of technically preferred limitations. The scope of the invention, however, is not limited to such embodiments unless there is any description specifically limiting the invention in the following description.

Figure 1:
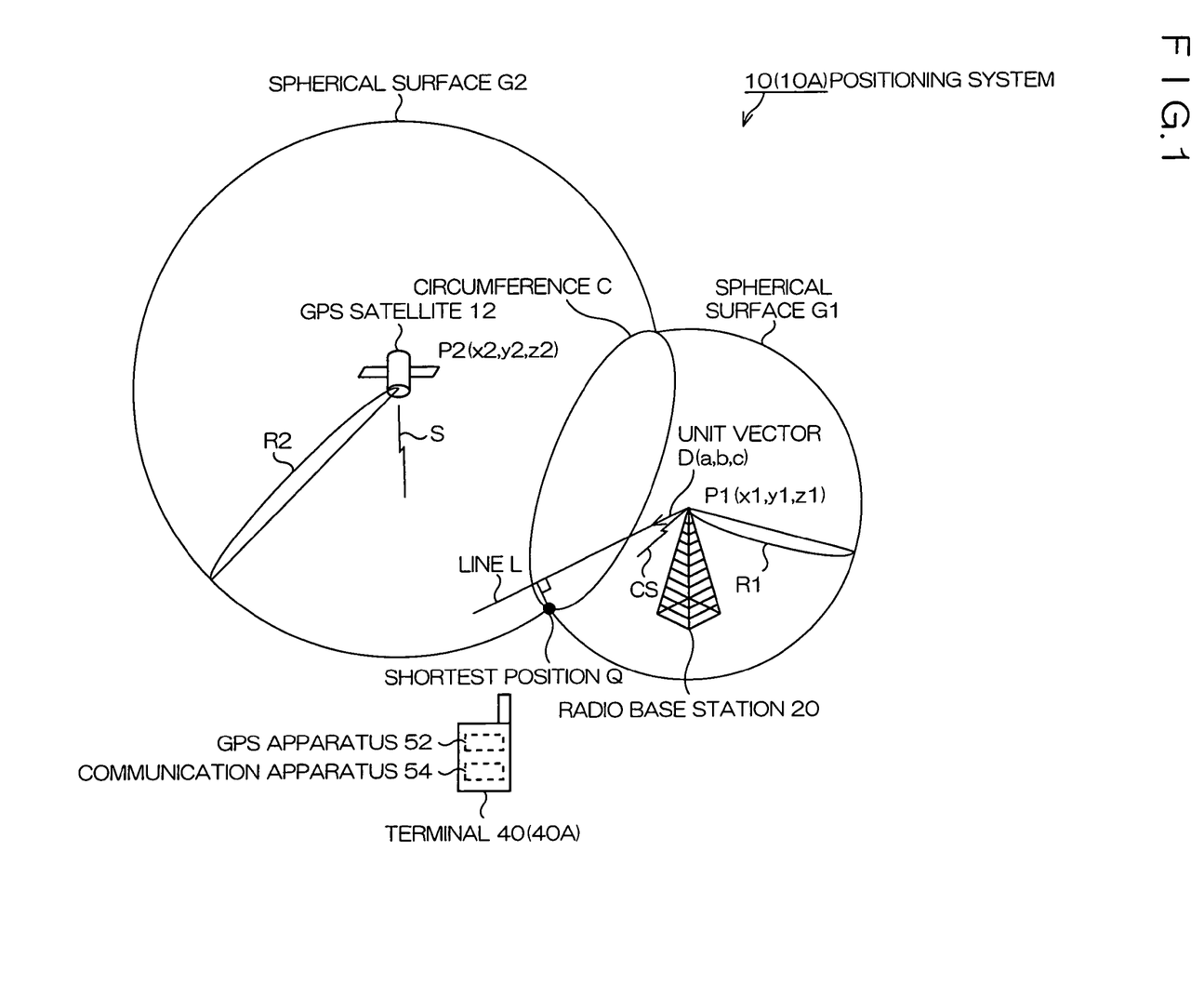
FIG. 1 is a schematic view of a positioning system in accordance with an embodiment of the invention.

FIG. 1 is a schematic view of a positioning system 10 according to an embodiment of the invention and the like.

As shown in FIG. 1, the positioning system 10 includes a terminal 40. The terminal 40 includes a GPS apparatus 52 and is capable of receiving a signal S, which is an example of a satellite signal, from a GPS satellite 12 which is an example of a positioning satellite. The terminal 40 is an example of a terminal apparatus.

The terminal apparatus 40 also includes a communication apparatus 54 and can communicate with a radio base station 20. The radio base station 20 (referred to as a base station 20, hereinafter) can send a communication signal CS to the terminal 40. The base station 20 is an example of a communication base station.

The terminal 40 is capable of communicating with another terminal apparatus and the like through the base station 20 and a communication network such as the internet (not shown), for example.

As described later, the terminal 40 can carry out positioning in the positioning system 10 on the basis of the communication signal CS from the base station 20 and the signal S from the GPS satellite 12.

The terminal 40 is a cellular phone, PHS (personal handyphone system), PDA (personal digital assistance) and such, for example, but not limited to the above.

The terminal 40 and the base station 20 respectively exist in plural numbers. This, however, is omitted from drawing and description in the embodiments.

Main Hardware Structure of Base Station 20

Figure 2:
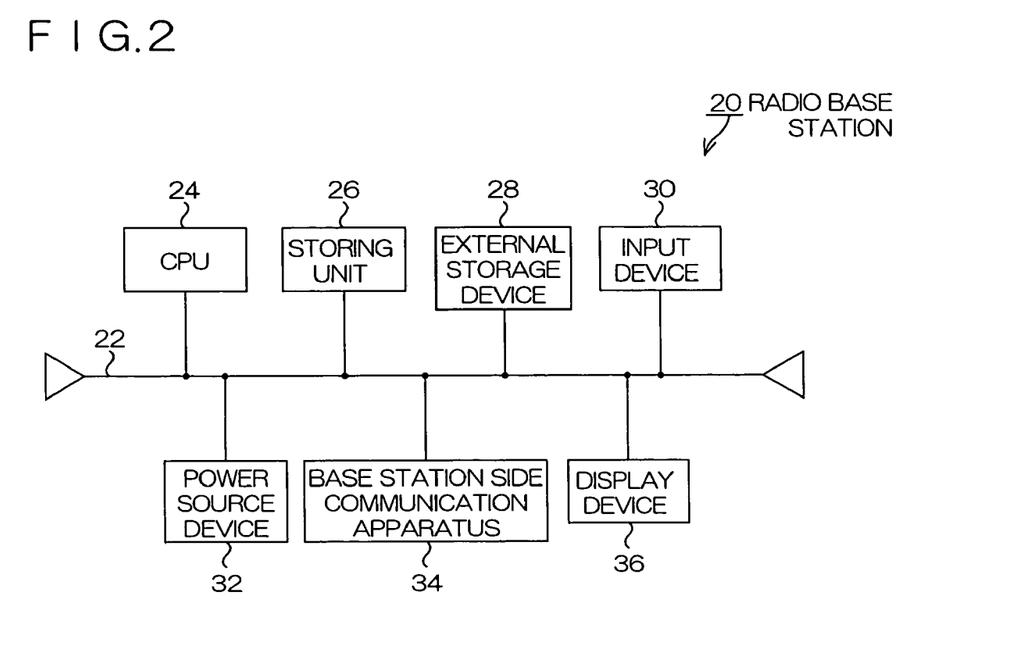
FIG. 2 is a schematic view of a main hardware structure of a radio base station.

FIG. 2 is a schematic view of a main hardware structure of the base station 20.

As shown in FIG. 2, the base station 20 has a computer, which includes a bus 22.

The bus 22 is connected with a CPU (central processing unit) 24, a storing unit 26, an external storing unit 28 and such. The storing unit 26 is a RAM (random access memory), a ROM (read only memory) or the like, for example. The external storing unit 28 is an HD (hard disk) or the like, for example.

The plural base stations 20 are not time-synchronized. That is to say, the positioning system 10 is applied to a communication base station asynchronous system.

The bus 22 is also connected to an input device 30 for inputting various kinds of information, a power source device 32, which is a power supplying unit, a base station side communication apparatus 34 and a display device 36 for displaying various kinds of information.

Main Hardware Structure of Terminal 40

Figure 3:
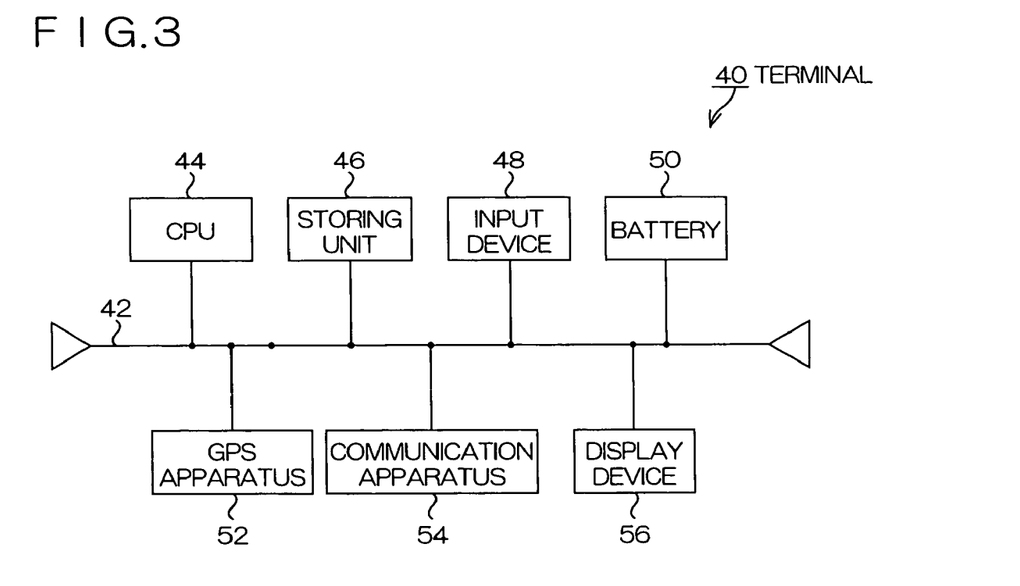
FIG. 3 is a schematic view of a main hardware structure of a terminal.

FIG. 3 is a schematic view of a main hardware structure of the terminal 40.

As shown in FIG. 3, the terminal 40 has a computer, which includes a bus 42.

The bus 42 is connected with a CPU 44, a storing unit 46, an input device 48, a battery 50, a GPS apparatus 52, a communication apparatus 54 and a display device 56.

Main Software Structure of Base Station 20

Figure 4:
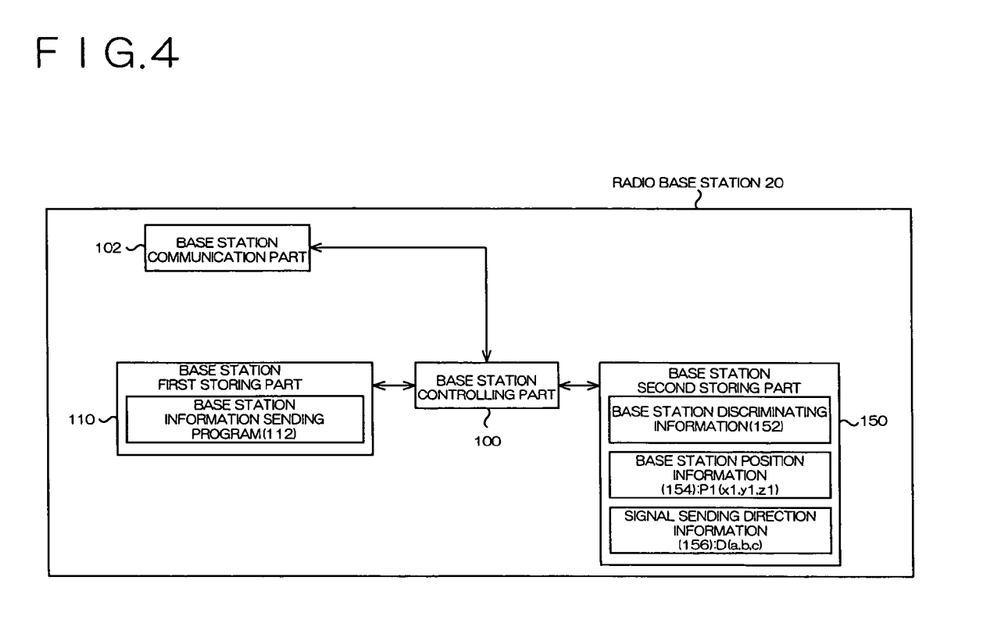
FIG. 4 is a schematic view of a main software structure of a radio base station.

FIG. 4 is a schematic view of a main software structure of the base station 20.

As shown in FIG. 4, the base station 20 comprises a base station controlling part 100 for controlling respective parts, a base station communication part 102 corresponding to the base station side communication apparatus 34 in FIG. 2, a base station first storing part 110 for storing various kinds of programs and a base station second storing part 150 for storing various kinds of information.

As shown in FIG. 4, the base station 20 includes base station discriminating information 152 stored in the base station second storing part 150. The base station discriminating information 152 is information for discriminating the base station 20 from the other communication base stations, the information denoted by a four-digit number, for example.

The base station 20 also includes base station position information 154 stored in the base station second storing part 150. The base station position information 154 is a coordinate showing a position of the base station 20. The base station position information 154 is information indicating latitude, longitude and altitude by a three-dimensional coordinate P1, for example. The base station position information 154 is an example of the base station position information.

The base station 20 also includes signal sending direction information 156 stored in the second storing part 150. The signal sending direction information 156 is information showing a direction of sending the communication signal CS such as a unit vector D (a, b, c), for example. The signal sending direction information 156 is an example of the sending direction information.

As shown in FIG. 4, the base station 20 includes a base station information sending program 112 stored in the base station first storing part 110. The base station information sending program 112 is a program for the base station controlling part 100 to send the communication signal CS including the base station discriminating information 152, the base station position information 154 and the signal sending direction information 156. That is to say, the base station information sending program 112 and the base station controlling part 100 are as a whole an example of the communication signal sending.

Concretely, the base station controlling part 100 sends the communication signal CS including the base station discriminating information 152, the base station position information 154 and the signal sending direction information 156 to the terminal 40, which is in communication, on the communication wave.

Main Software Structure of Terminal 40

Figure 5:
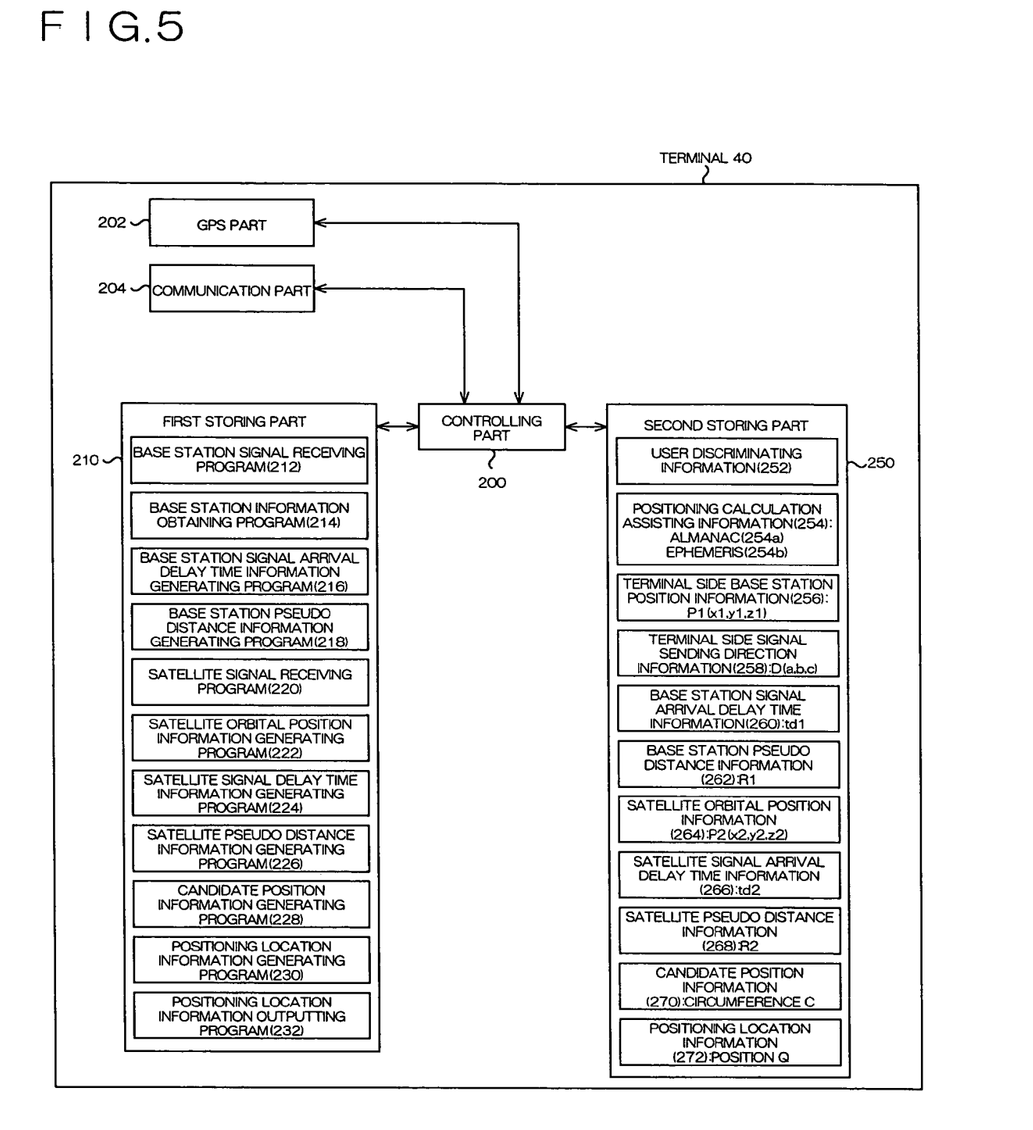
FIG. 5 is a schematic view of a main software structure of a terminal.

FIG. 5 is a schematic view of a main software structure of the terminal 40.

As shown in FIG. 5, the terminal 40 comprises a controlling part 200 for controlling respective parts, a GPS part 202 corresponding to the GPS apparatus 52 in FIG. 3, a communication part 204 corresponding to the communication apparatus 54 in FIG. 3, a first storing part 210 for storing various kinds of programs and a second storing part 250 for storing various kinds of information.

As shown in FIG. 5, the terminal 40 includes user discriminating information 252 stored in the second storing part 250. The user discriminating information 252 is information for discriminating the terminal 40 from the other terminal apparatuses.

As shown in FIG. 5, the terminal 40 includes positioning calculation assisting information 254 stored in the second storing part 250. The positioning calculation assisting information 254 includes Almanac 254a, which is schematic orbital information of the GPS satellite 12 and other GPS satellites (not shown), and Ephemeris 254b, which is precise orbital information of the respective GPS satellite 12 and the other GPS satellites.

As shown in FIG. 5, the terminal 40 includes a base station signal receiving program 212 stored in the first storing part 210. The base station signal receiving program 212 is a program for the controlling part 200 to receive the communication signal CS from the base station 20 at the communication part 204. That is to say, the base station signal receiving program 212 and the controlling part 200 are as a whole an example of the communication signal receiving means.

As shown in FIG. 5, the terminal 40 includes a base station information obtaining program 214 stored in the first storing part 210. The base station signal receiving program 214 is a program for the controlling part 200 to pick out the base station position information 154 and the signal sending direction information 156 from the communication signals CS to obtain terminal side base station position information 256 and terminal side signal sending direction information 258. That is to say, the base station information obtaining program 214 and the controlling part 200 are as a whole an example of the base station information obtaining means.

Concretely, the controlling part 200 picks out the base station position information 154 and the signal sending direction information 156 from the communication signals CS to store the base station position information 154 as the terminal side base station position information 256 and the signal sending direction information 156 as the terminal side signal sending direction information 258 in the second storing part 250.

As shown in FIG. 5, the terminal 40 includes a base station signal arrival delay time information generating program 216 stored in the first storing part 210. The base station signal arrival delay time information generating program 216 is a program for the controlling part 200 to generate base station signal arrival delay time information 260 showing a time td1 the communication signal CS takes to arrive at the terminal 40 from the base station 20 (referred to as a base station signal arrival delay time td1, hereinafter) on the basis of a sending time of the communication signal CS from the base station 20 and a time of receiving the communication signal CS by the terminal 40.

Information showing the sending time of the communication signal CS from the base station 20 is included in the communication signal CS. The time of receiving the communication signal CS by the terminal 40 is checked by means of a clock (not shown) in the terminal 40.

As shown in FIG. 5, the terminal 40 includes a base station pseudo range information generating program 218 stored in the first storing part 210. The base station pseudo range information generating program 218 is a program for the controlling part 200 to generate base station pseudo range information 262 showing a distance R1 between the base station 20 and the terminal 40 (referred to as a base station pseudo range R1, hereinafter) on the basis of the base station signal arrival delay time td1. The base station pseudo range information 262 is an example of the base station pseudo range information. The base station pseudo range information generating program 218 and the controlling part 200 are as a whole an example of the base station pseudo range information generating means.

Concretely, the controlling part 200 calculates the base station pseudo range R1 by multiplying the base station signal arrival delay time td1 by the light speed V, which is a velocity of the communication wave of the communication signal CS.

The controlling part 200 stores the generated base station pseudo range information 262 in the second storing part 250.

As shown in FIG. 5, the terminal 40 includes a satellite signal receiving program 220 stored in the first storing par 210. The satellite signal receiving program 220 is a program for the terminal 40 to receive the signal S from the GPS satellite 12.

As shown in FIG. 5, the terminal 40 includes a satellite orbital position information generating program 222 stored in the first storing par 210. The satellite orbital position information generating program 222 is a program for the controlling part 200 to generate satellite orbital position information 264 showing a position of the GPS satellite 12 in the satellite orbit on the basis of the signal S. That is to say, the satellite orbital position information generating program 222 and the controlling part 200 are as a whole an example of the satellite orbital position information generating means.

Concretely, the controlling part 200 calculates a position P2 of the GPS satellite 12 in the satellite orbit on the basis of the sending time information of the signal S1 included in the signal S1 and Ephemeris 254b of the positioning calculation assisting information 254.

The controlling part 200 stores the generated satellite orbital position information 264 in the second storing part 250.

As shown in FIG. 5, the terminal 40 includes a satellite signal delay time information generating program 224 stored in the first storing part 210. The satellite signal delay time information generating program 224 is a program for the controlling part 200 to generate satellite signal arrival delay time information 266 showing a time td2 the signal S1 takes to arrive at the terminal 40 from the GPS satellite 12 (referred to as a satellite signal arrival delay time td2, hereinafter) on the basis of a time of sending the signal S from, the GPS satellite 12 and a time of receiving the signal S by the terminal 40.

Information showing the time of sending the signal S from the GPS satellite 12 is included in the signal S. The time of receiving the signal S by the terminal 40 is checked by means of a clock (not shown) in the terminal 40.

The controlling part 200 stores the generated satellite signal arrival delay time information 266 in the second storing part 250.

As shown in FIG. 5, the terminal 40 includes a satellite pseudo range information generating program 226 stored in the first storing part 210. The satellite pseudo range information generating program 226 is a program for the controlling part 200 to generate satellite pseudo range information 268 showing a distance R2 between the GPS satellite 12 and the terminal 40 (referred to as a satellite pseudo range R2, hereinafter) on the basis of the satellite signal arrival delay time td2. The satellite pseudo range information 268 is an example of the satellite pseudo range information. The satellite pseudo range information generating program 226 and the controlling part 200 are as a whole an example of the satellite pseudo range information generating means.

Concretely, the controlling part 200 calculates the satellite pseudo range R2 by multiplying the satellite signal arrival delay time td2 by the light speed V, which is a velocity of the radio wave of the signal S.

The controlling part 200 stores the generated satellite pseudo range information 268 in the second storing part 250.

As shown in FIG. 5, the terminal 40 includes a candidate position information generating program 228 stored in the first storing part 210. The candidate position information generating program 228 is a program for the controlling part 200 to generate candidate position information 270 shown as a circumference C, which is a set of intersections of a spherical surface G1 having a radius of the base station pseudo range R1 with the position P1 of the base station 20 being the center and a spherical surface G2 having a radius of the satellite pseudo range R2 with the position P2 of the GPS satellite 12 being the center as shown in FIG. 1. That is to say, the candidate position information generating program 228 and the controlling part 200 are as a whole an example of the candidate position information generating means.

The current position of the terminal 40 is somewhere on the circumference C.

The controlling part 200 stores the generated candidate position information 270 in the second storing part 250.

As shown in FIG. 5, the terminal 40 includes a positioning location information generating program 230 stored in the first storing part 210. The positioning location information generating program 230 is a program for the controlling part 200 to generate positioning location information 272 out of positions on the circumference C shown in the candidate position information 270 (refer to FIG. 1) on the basis of a unit vector D shown in the terminal side sending direction information 258. That is to say, the positioning location information generating program 230 and the controlling part 200 are as a whole an example of the positioning location information generating means.

Concretely, the controlling part 200 designates a position Q nearest to a line L, which is an extended line of the unit vector D, as shown in FIG. 1 (referred to as a shortest position Q, hereinafter) out of positions on the circumference C (refer to FIG. 1).

The controlling part 200 stores the generated positioning location information 272 in the second storing part 250.

As shown in FIG. 5, the terminal 40 includes a positioning location information outputting program 232 stored in the first storing part 210. The positioning location information outputting program 232 is a program for the controlling part 200 to output the positioning location information 272 to display the same on the display device 56 (refer to FIG. 3), for example.

The positioning system 10 is arranged as described above.

As mentioned above, the base station 20 can send the communication signal CS including the base station position information 154 and the signal sending direction information 156 to the terminal 40.

On the other hand, the terminal 40 can receive the communication signal CS from the base station 20 to obtain the base station position information 154 and the signal sending direction information 156.

The terminal 40 can generate the base station pseudo range information 262.

Further, the terminal 40 can generate the satellite orbital position information 264 and the satellite pseudo range information 268.

Moreover, the terminal 40 can generate the candidate position information 270. The terminal 40 can designate one position out of positions on the circumference C shown in the candidate position information 270 on the basis of the terminal side signal sending direction information 258 to generate the positioning location information 272.

Therefore, in accordance with the positioning system 10, the current position can be positioned so long as the terminal 40 is capable of communicating with one base station 20 and receiving the signal S from one GPS satellite 12.

Generally, the precision of positioning with the signal S from the GPS satellite 12 or such is higher than that of positioning with the communication signal CS from the base station 20 or such. This means that using the signal S from the GPS satellite 12 or such allows highly precise positioning to be carried out.

In view of the above, the terminal 40 uses the communication signal CS from one base station 20 and the signal S from one GPS satellite 12 to perform positioning as described above, so that positioning with higher precision than the case of positioning only with plural communication signals CS can be carried out.

In addition, when a reckoned position of the current position is used as in the usual case, a wrong reckoned position leads an error in a positioning result. The terminal 40, however, generates the positioning location information 272 on the basis of a certain ground as described above without using information obtained by reckoning. This enables the positioning location information 272 to be generated with high reliability.

The structure of the positioning system 10 in accordance with the embodiment was described above. Now, an example of an operation of the positioning system 10 will be described mainly with reference to FIG. 6.

Figure 6:
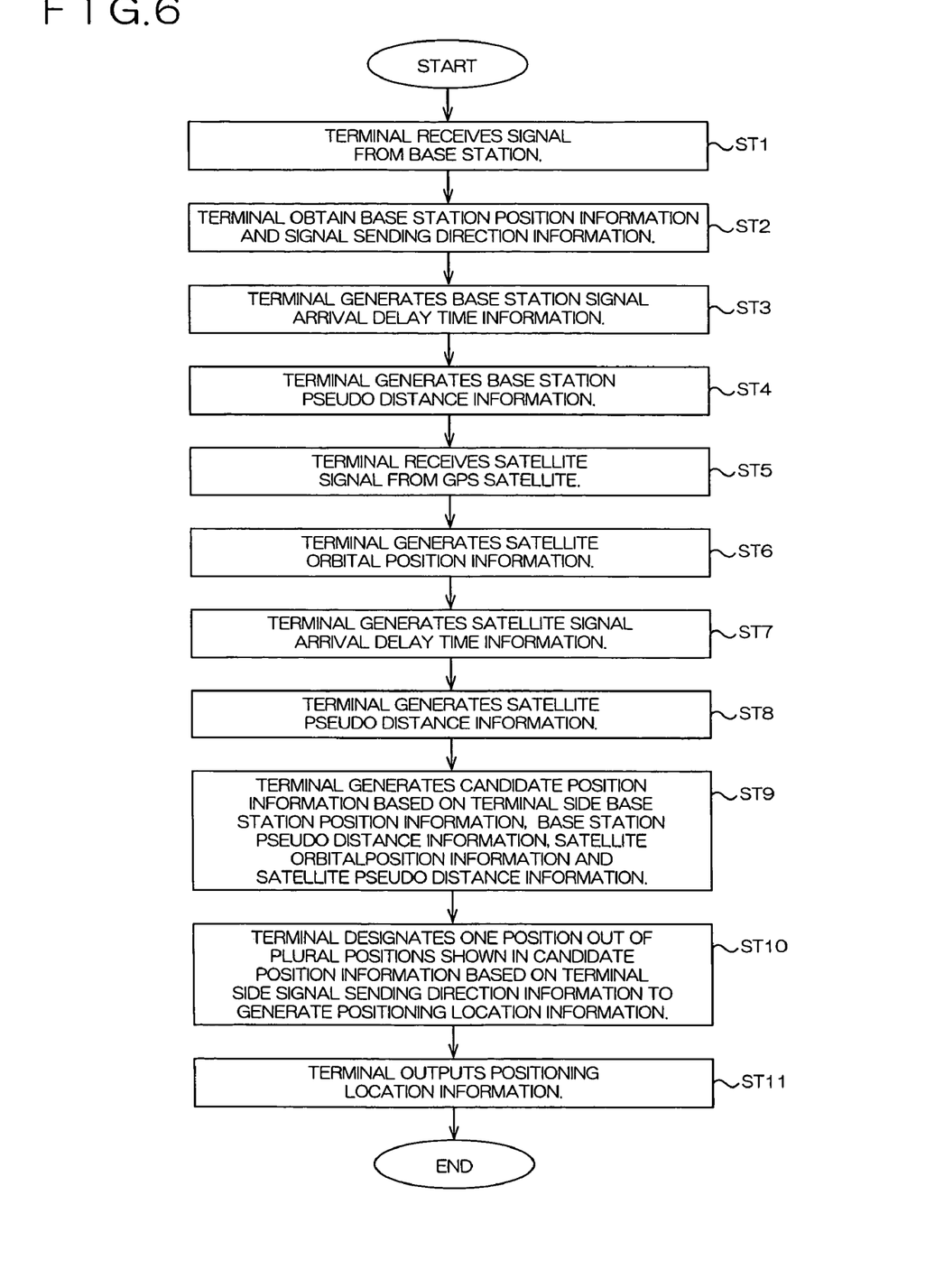
FIG. 6 is a schematic flowchart showing an example of an operation of a positioning system.

FIG. 6 is a schematic flowchart showing an example of an operation of the positioning system 10.

First, the terminal 40 receives the signal CS from the base station 20 (in Step ST1 in FIG. 6). Step ST1 is an example of a step of receiving a communication signal.

The terminal 40 then obtains the terminal side base station position information 256 and the terminal side signal sending direction information 258 (refer to FIG. 4) from the communication signal CS (in Step ST2). Step ST2 is an example of a step of obtaining base station information.

Then, the terminal 40 generates the base station signal arrival delay time information 260 (refer to FIG. 5) (in Step ST3).

The terminal 40 then generates the base station pseudo range information 262 (in Step ST4). Step ST4 is an example of a step of generating base station pseudo range information.

Following to the above, the terminal 40 receives the signal S (refer to FIG. 1) from the GPS satellite 12 (in Step ST5).

The terminal 40 then generates the satellite orbital position information 264 (refer to FIG. 5) (in Step ST6). Step ST6 is an example of a step of generating satellite orbital position information.

The terminal 40 then generates the satellite signal arrival delay time information 266 (refer to FIG. 5) (in Step ST7).

Then, the terminal 40 generates the satellite pseudo range information 268 (refer to FIG. 5) (in Step ST8). Step ST8 is an example of a step of generating satellite pseudo range information.

The terminal 40 then generates the candidate position information 270 (refer to FIG. 5) on the basis of the terminal side base station position information 256, the base station pseudo range information 262, the satellite orbital position information 264 and the satellite pseudo range information 268 (in Step ST9). Step ST9 is an example of a step of generating candidate position information.

Following to the above, the terminal 40 designates one position out of plural positions shown in the candidate position information 270 on the basis of the terminal side signal sending direction information 258 to generate the positioning location information 272 (refer to FIG. 5) (in Step ST10). Step St10 is an example of a step of generating positioning location information.

The terminal 40 then outputs the positioning location information 272 to display the same on the display device 56 (refer to FIG. 3), for example (in Step ST11).

As described above, the current position can be positioned so long as the terminal 40 is capable of communicating with one base station 20 and receiving the signal S from one GPS satellite 12.

Furthermore, the terminal 40 uses the communication signal CS from one base station 20 and the signal S from one GPS satellite 12 to perform positioning, so that positioning with higher precision than the case of positioning only with plural communication signals CS can be carried out.

Embodiment 2

Now, a positioning system 10A in Embodiment 2 (refer to FIG. 1) will be described. A structure of the positioning system 10A in Embodiment 2 is same in many points with that of the positioning system 10 in Embodiment 1. Accordingly, the common components are marked with same reference signs and numerals and omitted from description. The different points will be mainly described hereinafter.

A terminal 40A of the positioning system 10A in Embodiment 2 uses information showing altitude of a position of the terminal 40A to generate positioning location information 272.

Figure 7:
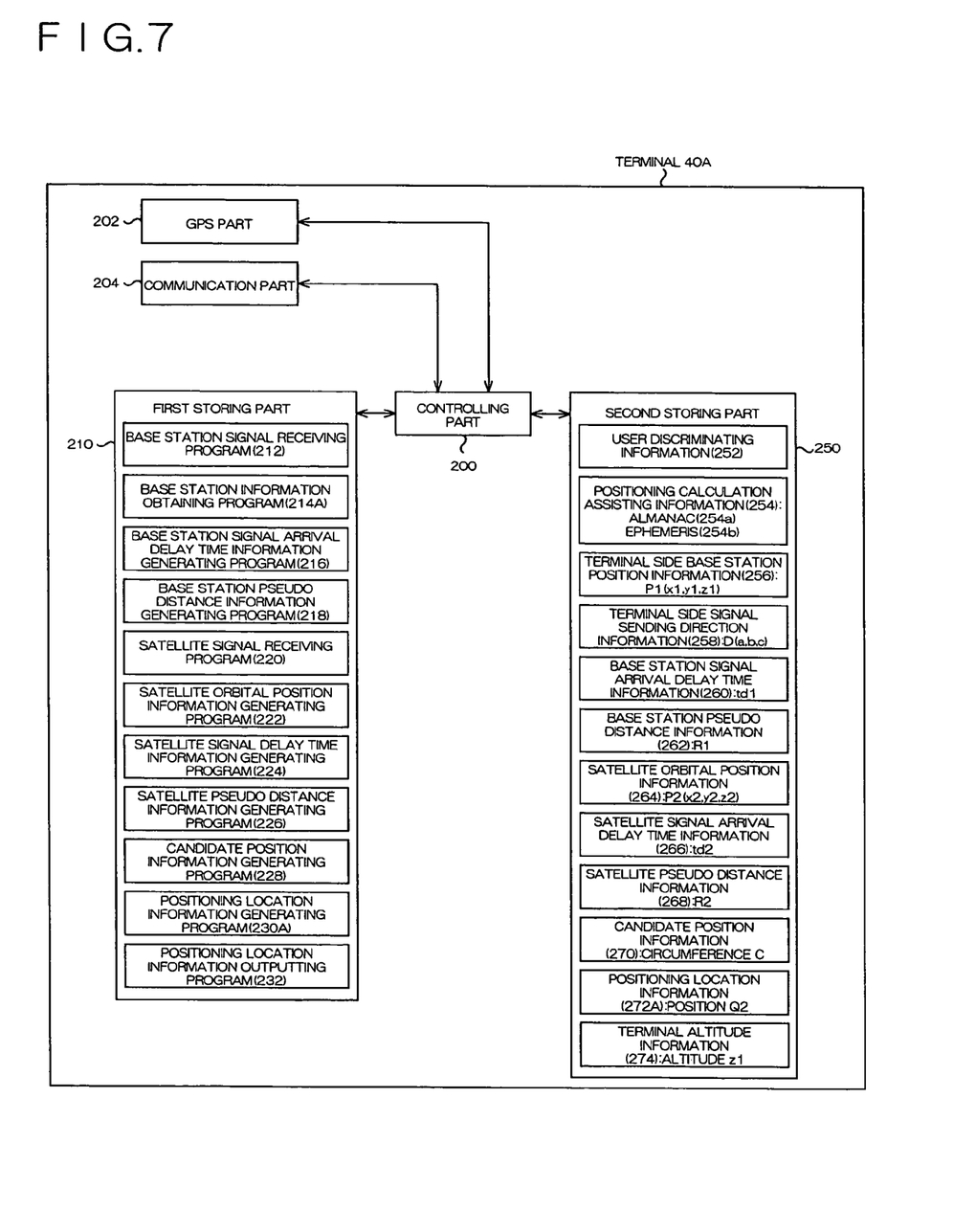
FIG. 7 is a schematic view of a main software structure of a terminal.

FIG. 7 is a schematic view of a main software structure of the terminal 40A.

Figure 8:
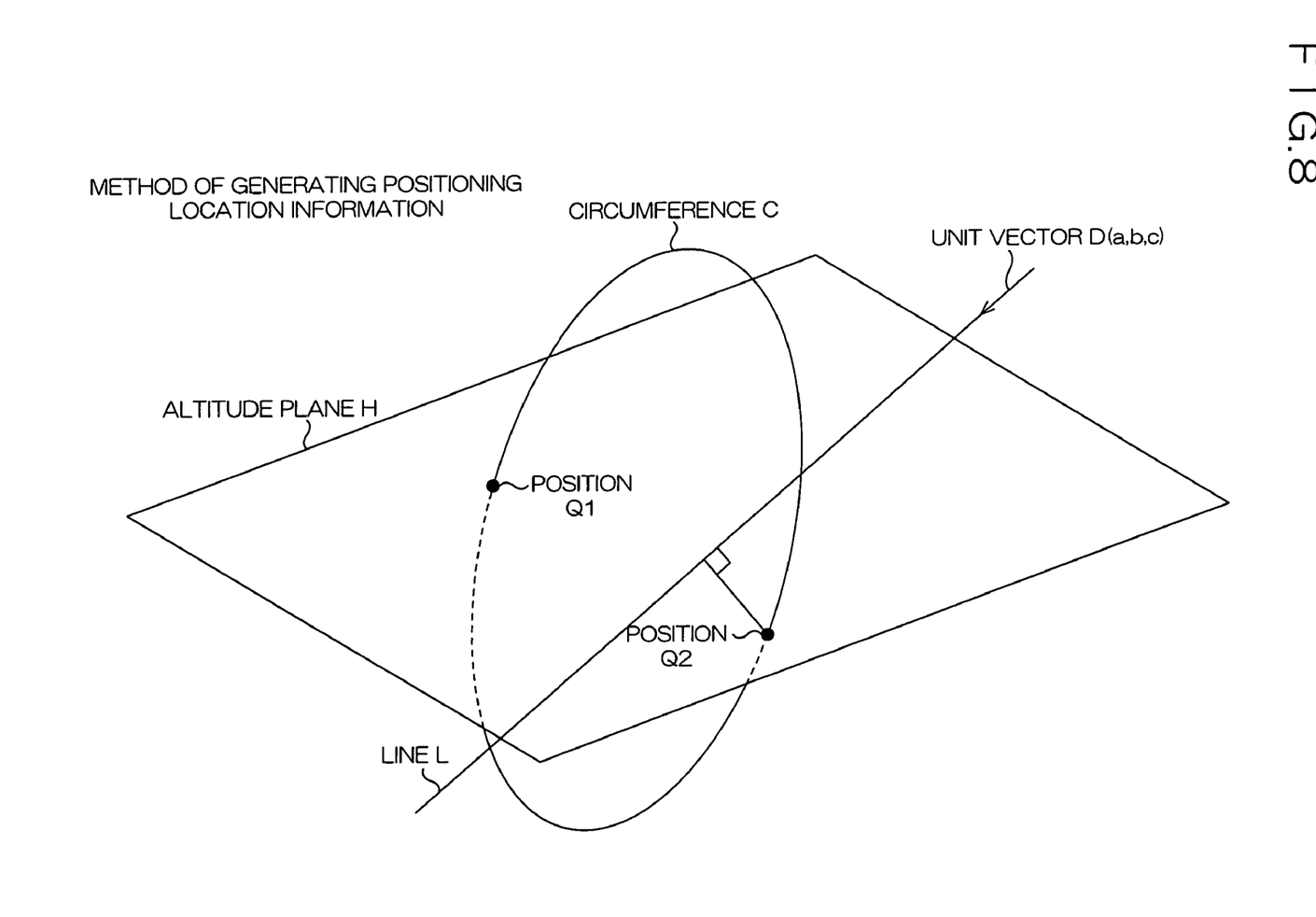
FIG. 8 illustrates an example of a method of generating positioning location information.

FIG. 8 illustrates an example of a method of generating the positioning location information 272.

As shown in FIG. 7, the terminal 40A includes a base station information obtaining program 214A stored in the first storing part 210. The base station information obtaining program 214A is a program for the controlling part 200 to obtain the terminal side base station position information 256 and the terminal side signal sending direction information 258 from the base station signal CS and to pick out an altitude component z1 of the position P1 of the base station 20, which is shown in the terminal side base station position information 256, as the terminal altitude information 274.

The controlling part 200 stores the picked terminal altitude information 274 in the second storing part 250. The terminal 40A uses the altitude of the base station 20 as the terminal altitude information 274 showing the altitude of the terminal 40A since the terminal 40A is in communication with the base station 20 and located within a communication area of the base station 20.

The terminal altitude information 274 is an example of the altitude information. The second storing part 250 is an example of the altitude information storing means.

As shown in FIG. 7, the terminal 40A includes a positioning location information generating program 230A stored in the first storing part 210. The positioning location information generating program 230A is a program for the controlling part 200 to designate one position out of positions on the circumference C shown in the candidate position information 270 on the basis of the terminal altitude information 274 and the terminal side signal sending direction information 258, as shown in FIG. 8.

Concretely, the controlling part 200 calculates a position Q1 and a position Q2, which are intersections of the circumference C and an altitude plane H, as shown in FIG. 8, the altitude plane H being a set of positions whose altitude shown in the terminal altitude information 274 is z1. The circumference C is a set of intersections of the spherical surface G1 and the spherical surface G2 (refer to FIG. 1).

The terminal 40A is located on the circumference C and on the altitude plane H whose altitude is z1. Accordingly, the terminal 40A is located on either one of two intersections of the circumference C and the altitude plane H. That is to say, the position of the terminal 40A is either one of the positions Q1 and Q2.

The controlling part 200 then designates one position, which is the position Q2, as a position of the terminal 40A on the basis of the terminal side signal sending direction information 258. Specifically, the controlling part 200 designates the position Q2 having a shorter distance to the line L, which is an extended line of the unit vector D shown in the terminal side signal sending direction information 258, as the position of the terminal 40A.

The controlling part 200 stores the positioning location information 272A generated as mentioned above in the second storing part 250 to display the same on the display device 56 (refer to FIG. 3).

As described above, the terminal 40A uses not only the terminal side signal sending direction information 258 but also the terminal altitude information 274 to designate one position out of positions on the circumference C. Accordingly, the reliability of the positioning location information 272A becomes higher than the case of designating one position on the basis of only the terminal side signal sending direction information 258.

Further, the terminal side signal sending direction information 258 is used for designating one of two intersections Q1 and Q2. Therefore, required is only the precision capable of designating one of the two intersections Q1 and Q2.

This allows one of the two intersections Q1 and Q2 to be designated and the positioning location information 272A to be generated even when the precision of the terminal side signal sending direction information 258 is low so long as one of the two intersections Q1 and Q2 can be designated with the precision.

Program and Computer-readable Storing Medium

It is possible to provide a program of controlling the terminal apparatus for letting a computer execute the step of receiving a communication signal, the step of obtaining base station information, the step of generating base station pseudo range information, the step of generating satellite orbital position information, the step of generating satellite pseudo range information, the step of generating candidate position information, the step of generating positioning location information and such in the above-mentioned example of the operation.

It is also possible to provide a computer-readable storing medium for storing a program of controlling the terminal apparatus.

A program storing medium used for installing the program of controlling the terminal apparatus in a computer and for preparing the program for execution by the computer can be achieved in the form of not only a package medium such as a flexible disk, like a floppy (a registered trademark), for example, a CD-ROM (compact disc read only memory), a CD-R (compact disc-recordable), a CD-RW (compact disc-rewritable) and a DVD (digital versatile disc), but also a semiconductor memory, a magnetic disk or an optically magnetic disk in which a program is temporally or permanently stored.

The invention is not limited to the respective embodiments mentioned above. Further, the respective embodiments can be combined with each other in arranging.

What is claimed is:

1. A positioning method comprising:
   receiving a communication signal from a communication base station, the communication signal including sending direction information that indicates a sending direction by a three-dimensional vector and base station position information that indicates a position of the commutation base station, the communication base station sending the communication signal along the sending direction;
   receiving a satellite signal from a given positioning satellite;
   calculating a base station pseudo range on the basis of an arrival delay time that the communication signal takes to arrive at a terminal apparatus form the communication base station;
   calculating a satellite orbital position that is a position of the given positioning satellite;
   calculating a satellite pseudo range on the basis of an arrival delay time that the satellite signal takes to arrive at the terminal apparatus from the given positioning satellite;
   calculating candidate positions indicated by a set of intersections between a first spherical surface and a second spherical surface, the first spherical surface being formed around the position of the communication base station indicated by the base station position information and having a radius that corresponds to the base station pseudo range, and the second spherical surface being formed around the position satellite orbital position and having a radius that corresponds to the satellite pseudo range; and
   designating a positioning location from the candidate positions, the positioning location being a position that is nearest to an extended line that extends in the direction of the three-dimensional vector indicated by the sending direction information from the position of the communication base station indicated by the base station position information.

2. The positioning method according to claim 1, wherein the calculating of the candidate positions includes calculating a circumference that is a set of intersections between the first spherical surface and the second spherical surface as a set of the candidate positions, and
   the designating of the positioning location includes calculating two intersections between the circumference that is the set of the candidate positions and a plane defined by an altitude of the communication base station indicated by the base station position information, and designating one of the two intersections that is nearer to the extended line as the positioning location.

3. A terminal apparatus comprising:
   a communication signal receiving section that receives a communication signal from a communication base station, the communication signal including sending direction information that indicates a sending direction by a three-dimensional vector and base station position information that indicates a position of the communication base station, the communication base station sending the communication signal along the sending direction;
   a satellite signal receiving section that receives a satellite signal from a given positioning satellite;
   a base station pseudo range information generating section that generates information that indicates a base station pseudo range on the basis of an arrival delay time that the communication signal takes to arrive at the terminal apparatus from the communication base station;
   a satellite orbital position information generating section that generates information that indicates a satellite orbital position that is a position of the given positioning satellite;
   a satellite pseudo range information generating section that generates information that indicates a satellite pseudo range on the basis of an arrival delay time that the satellite signal takes to arrive at the terminal apparatus from the given positioning satellite;
   a candidate position calculating section that calculates candidate positions indicated by a set of intersections between a first spherical surface and a second spherical surface, the first spherical surface being formed around the position of the communication base station indicated by the base station position information and having a radius that corresponds to the base station pseudo range, and the second spherical surface being formed around the position satellite orbital position and having a radius that corresponds to the satellite pseudo range; and
   a positioning location designating section that designates a positioning location from the candidate positions, the positioning location being a position that is nearest to an extended line that extends in the direction of the three-dimensional vector indicated by the sending direction information from the position of the communication base station indicated by the base station position information.

* * * * *